(12) United States Patent
Kretschmann

(10) Patent No.: US 12,446,137 B2
(45) Date of Patent: Oct. 14, 2025

(54) ILLUMINATION DEVICE AND ILLUMINATION PROCESS WITH CONTRAST VARIATION

(71) Applicant: Drägerwerk AG & Co. KGaA, Lübeck (DE)

(72) Inventor: Hanno Kretschmann, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 230 days.

(21) Appl. No.: 18/458,202

(22) Filed: Aug. 30, 2023

(65) Prior Publication Data
US 2024/0080956 A1 Mar. 7, 2024

(30) Foreign Application Priority Data
Sep. 5, 2022 (DE) .................. 10 2022 122 412.0

(51) Int. Cl.
*H05B 47/155* (2020.01)
*G01C 3/02* (2006.01)
*H05B 47/11* (2020.01)
*H05B 47/17* (2020.01)

(52) U.S. Cl.
CPC ............. *H05B 47/155* (2020.01); *G01C 3/02* (2013.01); *H05B 47/11* (2020.01); *H05B 47/17* (2020.01)

(58) Field of Classification Search
CPC ........ H05B 47/10; H05B 47/11; H05B 47/17; H05B 47/155; G01C 3/02
See application file for complete search history.

(56) References Cited

U.S. PATENT DOCUMENTS

| | | | |
|---|---|---|---|
| 2003/0185009 A1* | 10/2003 | Walters | F21V 23/0442 362/802 |
| 2005/0195601 A1* | 9/2005 | Marka | F21V 21/403 362/244 |
| 2009/0318772 A1* | 12/2009 | Marka | F21V 23/0471 315/297 |
| 2017/0318644 A1* | 11/2017 | Hartl | H05B 47/115 |

FOREIGN PATENT DOCUMENTS

| | | |
|---|---|---|
| DE | 202020104906 U1 | 9/2020 |
| EP | 2136126 B1 | 8/2010 |
| EP | 1741975 B1 | 9/2011 |
| EP | 3726127 A1 | 10/2020 |
| WO | 2012117108 A1 | 9/2012 |

* cited by examiner

*Primary Examiner* — Thomas M Sember
(74) *Attorney, Agent, or Firm* — McGlew and Tuttle, P.C.

(57) ABSTRACT

An illumination device (100) with a main illumination unit (1) and an auxiliary illumination unit (2). Each illumination unit (1, 2) includes a plurality of light source groups, respectively, which can be controlled individually. The maximum illuminance achieved by the main illumination unit (1) on an illuminated surface (Ob) is several times greater than the maximum illuminance achieved by the auxiliary illumination unit (2). The $d_x$ light field (light field diameter) of the main illumination unit (1) on the surface (Ob) has a significantly smaller area than the $d_x$ light field of the auxiliary illumination unit (2). The switched-on auxiliary illumination unit (2) is able to reduce the contrast of the illumination device (100).

19 Claims, 5 Drawing Sheets

ILLUMINATION DEVICE AND ILLUMINATION PROCESS WITH CONTRAST VARIATION

CROSS REFERENCE TO RELATED APPLICATIONS

This application claims the benefit of priority under 35 U.S.C. § 119 of German Application 10 2022 122 412.0, filed Sep. 5, 2022, the entire contents of which are incorporated herein by reference.

TECHNICAL FIELD

The invention relates to an illumination device (lighting device) and three illumination processes, which in many cases result in illuminating a surface well suited to the particular application.

BACKGROUND

One possible application of the invention is an illumination device that illuminates a medical operating table and is therefore also referred to as an operating room light.

SUMMARY

It is an object of the invention to provide an illumination device and an illumination process that are more ergonomic than known devices and processes.

The task is solved by an illumination device having illumination device features according to the invention and by an illumination process having illumination process features of the various illumination processes according to the invention. Advantageous embodiments of the illumination device according to the invention are, as far as useful, also advantageous embodiments of lighting processes according to the invention and vice versa.

In the following, some terms concerning an illumination unit (lighting unit) are first defined. These terms apply to the illumination device according to the invention as well as to the two illumination units and, as far as useful, also to the individual light sources of the illumination units.

"Illuminance" (Ev) (also known as illumination intensity) describes the luminous flux per unit area incident on a surface. The SI unit is lux=lumen/m^2. In a plane perpendicular to the optical center axis of an illumination unit, the illuminance of the illumination unit typically takes the maximum value at the intersection of the optical center axis with this plane. Typically, this maximum illuminance value varies along the central optical axis, i.e., with the distance between the illumination unit and the illuminated surface, as follows: Starting from the illumination unit, this maximum value increases until it reaches a maximum, and then decreases again. The value at this maximum is called the "maximum illuminance in space" of the illumination unit. Usually, the maximum illuminance in space occurs on the optical center axis. The area where the illuminance takes the maximum value can be on an illuminated surface or in front of the illuminated surface. If the illuminated object is or would be transparent, the area can also be behind the object.

As a rule, the maximum illuminance in space that an illumination unit can achieve is known due to the configuration of the illumination unit, in particular due to the illuminances of the individual light sources and the positioning of the generated light beams relative to each other. Due to the construction of the illumination unit or due to measurements performed in advance, it is further known how the maximum value of the illuminance on the optical center axis depends on the distance. This functional dependence of the illuminance on the distance can depend on further adjustable or configuration-dependent predetermined parameters of the illumination unit.

Various parameters of an illumination unit depend on the distance between the illumination unit and an illuminated surface. Therefore, these parameters are usually related to a given reference distance. In the case of a surgical light, this reference distance is often 1 m. From the configuration of the illumination unit, the maximum illuminance in the room and the functional dependence of the maximum illuminance on the distance are known. Therefore, or based on measurements performed in advance, the maximum illuminance at the reference distance is also known. Often, an illumination unit is configured so that the maximum illuminance in space occurs at the reference distance. The maximum illuminance at the reference distance is used in preferred implementations of various embodiments of the invention, which will be described below.

An illumination unit generates a light field on an illuminated surface. This light field has an illuminance that varies over the illuminated surface and assumes a maximum in a point or an area of the surface.

If the surface is flat and perpendicular to the optical center axis of the illumination unit, the area on the surface where the average illuminance is x % of the maximum illuminance is typically a circle. An average value over the respective illuminance in several points on this circle is preferably used as the average illuminance, in particular in at least four points evenly distributed on the circle. The diameter of this circle is often also referred to as the light field diameter $d_x$ and depends on the distance between the illumination unit and the illuminated surface. Therefore, the light field diameter $d_x$ is often related to the given reference distance between the illumination unit and the illuminated surface, for example the reference distance of 1 m mentioned above. In a medical illumination unit, x=10% is often used, sometimes x=50%, and the light field diameter is the diameter at which the illuminance is one-tenth or one-half of the maximum illuminance on the surface. In an illumination unit for an operating table, $d_{10}$ is typically between 13 cm and 35 cm. Often, such an illumination unit produces a relatively sharply defined (focused) light field, so that $2*d_{50} > d_{10}$ applies.

An illumination unit has a central optical axis. Often, the maximum illuminance on an illuminated plane that is perpendicular to the optical axis occurs at the intersection of the optical center axis and the illuminated plane. A three-dimensional representation of the light field on the surface, with the surface extending in the x-y plane of the representation, the optical axis lying in the z-axis, and the respective illuminance at a point (x, y) plotted on the z-axis, often ideally has the form of a bell curve that is rotationally symmetrical to the optical center axis.

The light field diameter $d_x$ was defined above. The parameter light field diameter $d_x$ alone does not completely describe the light field of an illumination unit. In particular, this parameter $d_x$ does not describe how large the illuminance on the illuminated surface is outside the circle with diameter $d_x$ around the point of maximum illuminance. The three-dimensional bell curve just described may slope steeply or flatly outside the circle of diameter $d_x$. Often the simplifying assumption is made that outside the circle with diameter $d_x$ there is no light with a relevant brightness at all. However, this assumption is often wrong.

A measurable and preferably adjustable parameter for the light field of an illumination unit outside the circle with diameter $d_x$ is defined below. This parameter has not yet been described in the public domain. Because the light field outside the circle with diameter $d_x$ affects the contrast perceived by a human being between a bright and a dark area on an illuminated surface, the parameter is abbreviated as "contrast". The parameter does not depend on the maximum illuminance $Ev_{max}$ or on the light field diameter $d_x$.

According to the novel definition, the contrast is defined as the ratio (quotient) of
the maximum illuminance $Ev_{max}$ and
the average illuminance $Ev(x*d_{10})$ on a circle of diameter $x*d_{10}$ around a point of maximum illuminance,
thus contrast=$Ev_{max}/Ev(x*d_{10})$. The factor x here is greater than 1 and is preferably between 1.5 and 3. The inventor has found in internal tests that x=2 is a particularly suitable value, so contrast=$Ev_{max}/Ev(2*d_{10})$. The lower the achieved illuminance outside the circle with diameter $d_{10}$, the higher the contrast of an illumination unit according to this definition.

The illumination device according to the invention is described in the following. The illumination processes according to the invention are carried out using such an illumination device.

The illumination device according to the invention comprises a main illumination unit (main lighting unit) and an auxiliary illumination unit (auxiliary lighting unit, supplementary illumination unit). The main illumination unit comprises at least two groups of light sources, the auxiliary illumination unit comprises at least one light source group, preferably also at least two groups of light sources. Each light source group comprises at least one light source each, in one implementation several light sources each. Each light source group can be controlled independently of any other light source group of the illumination device, and by the control at least one parameter of the light source group can be changed, in particular the maximum illuminance and optionally a light spectrum. Preferably, each light source belongs to exactly one light source group and thus to either the main illumination unit or the auxiliary illumination unit. In one embodiment, each light source of the illumination device can be controlled individually—in other words, each light source group comprises exactly one light source.

The illumination device is capable of illuminating a surface. This surface is, for example, an operating table or the surface of a patient on the operating table, and the illumination device illuminates this surface vertically or obliquely from above.

The two illumination units of the illumination device according to the invention are each capable of achieving a light field on the illuminated surface. The illuminance that the illumination unit achieves on the surface varies over the surface. At each point of the illuminated surface, one illuminance occurs at a time. The two illuminances achieved by the two illumination units at one point on the surface add up. The total light field that the illumination device achieves on the surface is therefore composed additively of the light fields of the two illumination units.

The illumination device according to the invention is able to capture (detect) an illuminance specification (an illuminance setting). This illuminance specification defines the maximum illuminance that the illumination device is to achieve. The maximum achieved illuminance is smaller than or equal to the illuminance that the illumination device can achieve at maximum (maximum achievable illuminance). Preferably, the illuminance specification and the maximum achievable illuminance refer to a predetermined reference distance, in particular to the above-mentioned reference distance of 1 m. The maximum achievable illuminance is usually predetermined by the configuration of the illumination device. The illuminance specification can originate from a user or from a higher-level control system and can in particular be an absolute value or a proportion of the maximum achievable illuminance or also a required change (increment) compared to the current value.

According to the invention, the illumination device is configured as follows: At least when two conditions are met, two effects according to the invention are obtained.

The two conditions are as follows:
The distance between the illumination device and the illuminated surface is within a predetermined distance range. Preferably, this distance range is the range of 0.7 m to 1.5 m. When a surgical light is used as the illumination device, a distance in this distance range typically occurs between an operating table and the illumination device.
The maximum illuminance that the illumination device should achieve according to the illuminance specification is at least 20% of the maximum achievable illuminance, preferably at least 50%.

The effects obtained according to the invention are the following:
The maximum illuminance that the auxiliary illumination unit achieves on the surface is at least 1% and at most 15% of the maximum illuminance that the main illumination unit achieves on the surface. Preferably, the maximum illuminance of the auxiliary illumination unit is between 2% and 5% of the maximum illuminance of the main illumination unit. Of course this ratio only occurs if both illumination units are switched on.
The $d_x$ light field of the main illumination unit on the surface has an area at least 50% smaller than the $d_x$ light field of the auxiliary illumination unit, preferably an area at least 80% smaller. The term "$d_x$ light field of an illumination unit" is understood to mean that area on the illuminated surface in which the illuminance is at least x % of the maximum illuminance. In the case of a flat surface that is perpendicular to the optical center axis, this area is bounded by a circle with the light field diameter $d_x$ and then generally has the shape of a full circle.

According to the invention, the illumination device achieves these two effects at least when the two conditions are met. The distance range between 0.7 m and 1.5 m is the range in which the typical distance between a medical operating light and a patient to be treated on an operating table lies when used. The effects described above can also occur outside this distance range, but do not necessarily occur there. In a medical procedure, the maximum illuminance of the lighting fixture should generally be at least 20% of the maximum illuminance that can be achieved. A lower maximum illuminance is usually only used if the illumination device is not currently being used to illuminate a patient, but for example to illuminate the empty operating table or the operating room.

On the one hand, high contrast is often desired, especially in medical applications, in order to focus the emitted light particularly well on a specific area of the patient's surface. This area should be brightly illuminated. On the other hand, very high contrast can cause a doctor's eyes to tire relatively quickly, especially if the doctor frequently looks alternately at a strongly illuminated area and a dimly illuminated area, for example, alternately at the area where an operation is taking place and at the area where a required medical instrument is located. If a camera is generating images of the surgery so that these images can be displayed on a spatially distant display unit, for example for students, it is often the case that if the contrast is very high, the camera may not adapt sufficiently well to the changing brightness. It is also possible that an image from the camera has very bright and very dark areas, so that the camera cannot automatically adjust itself to display both bright areas and dark areas well.

As derived above, the contrast obtained on the surface can be quantitatively specified as the ratio between the maximum illuminance $Ev_{max}$ of the illumination device on the illuminated surface and the illuminance $Ev(x*d_{10})$ on the surface at the distance $x/2*d_{10}$ from the point of maximum illuminance, i.e. contrast equal to $Ev_{max}/Ev(x*d_{10})$ with a factor x greater than 1, preferably x between 1.5 and 3, more preferably x equal to 2.

In many cases, the switched-on auxiliary illumination unit reduces the contrast achieved. In a medical illumination unit that has only one main illumination unit with multiple light sources, the contrast is typically between 50 and 400. The auxiliary illumination unit can be configured to reduce the contrast by a factor that is between 1.5 and 10, preferably by a factor between 3 and 6. The main illumination unit does not need to be changed to reduce the contrast.

According to the invention, the maximum illuminance of the auxiliary illumination unit is considerably smaller than that of the main illumination unit, but conversely the light field, and in particular the light field diameter $d_x$, of the main illumination unit is at most half as large as the light field or the light field diameter $d_x$ of the auxiliary illumination unit, at least for a predetermined x of, for example, 10%. Therefore, essentially a relatively narrow area on the illuminated surface is brightly illuminated, for example an area of the patient's body in or on which surgery is taking place. On the other hand, when the auxiliary illumination unit is switched on or permanently illuminated, a larger area on the surface is illuminated weaker, in particular to reduce contrast, compared to an embodiment with or without the auxiliary illumination unit switched off.

According to the invention, the maximum illuminance of the auxiliary illumination unit is in a range between 1% and 15% of the maximum illuminance of the main illumination unit, particularly preferably in a range between 2% and 5%. This feature applies to the entire distance range and preferably in particular to the reference distance. The feature results in the auxiliary illumination unit having only a relatively small influence on the overall maximum illuminance achieved by the illumination device as a whole on the illuminated surface. In particular, it is possible to switch the auxiliary illumination unit on and off or to change its maximum achievable illuminance without significantly changing the maximum illuminance of the illumination device. Particularly preferably, the maximum illuminance that the illumination device achieves on the surface ideally remains unchanged when the auxiliary illumination unit is switched on or off. With the main illumination unit unchanged and/or the maximum illuminance unchanged, the eyes of a physician or other person looking at the area of maximum illuminance in the vicinity of the surface need little or even no adjustment to a change in brightness when the auxiliary illumination unit is switched on or off.

According to the invention, the $d_x$ light field of the main illumination unit is at most half as large as the $d_x$ light field of the auxiliary illumination unit, and particularly preferably at most a quarter as large. This configuration leads on the one hand to a particularly focused main illumination unit and on the other hand to an auxiliary illumination unit that illuminates a relatively large area on the surface.

According to the invention, the maximum illuminance that the auxiliary illumination unit achieves on the surface is at least 1% and at most 15% of the maximum illuminance that the main illumination unit achieves on the surface. Preferably, the maximum illuminance achievable by the auxiliary illumination unit at the reference distance is at least 1% and at most 15% of the maximum illuminance achievable by the main illumination unit at the reference distance. As already explained, the maximum achievable illuminance is typically a parameter specified by the configuration of the illumination unit.

Preferably, the light field of the main illumination unit is completely contained in the light field of the auxiliary illumination unit. This feature ensures with even greater reliability that, on the one hand, a central area of the light field generated by the illumination device on the surface is strongly illuminated and, on the other hand, excessive contrast is avoided. Particularly preferably, the center of the light field of the main illumination unit coincides with the center of the light field of the auxiliary illumination unit.

The position and orientation of the auxiliary illumination unit relative to the main illumination unit can preferably not be changed. Particularly preferably, both illumination units are mounted on a support and/or in a housing of the illumination device. Preferably, the position and orientation of the illumination device relative to the illuminated surface can be changed, for example manually by a user with the aid of a handle on the aforementioned carrier or housing or also by an actuator. Preferably, the illumination device is mounted to a ceiling or a wall by means of a support unit, wherein the support unit comprises at least one joint.

Preferably, the auxiliary illumination unit can be switched on and switched off. Particularly preferably, three different modes are possible in which the illumination device can be operated:

Main illumination unit switched on, auxiliary illumination unit switched off,

Main illumination unit and auxiliary illumination unit switched on,

Main illumination unit switched off; auxiliary illumination unit switched on—this is preferably only for illuminating the empty operating table.

Particularly preferably, the illumination device is able to capture a user specification (user setting or data input). This user specification determines whether the auxiliary illumination unit is to be switched on or off. A control unit of the illumination device is able to switch the auxiliary illumination unit on or off depending on the user specification. Particularly preferably, the control unit is also able to switch the main illumination unit on or off depending on a user specification.

The feature with the three modes and the feature with the user default allow in particular a user to selectively produce a smaller light field (only main illumination unit switched on) or a lower contrast (both illumination units switched on). It is also possible to illuminate a relatively large area of the surface only relatively weakly (only auxiliary illumination unit switched on). Of course, it is also possible to switch off the illumination device and thus both illumination units, especially if the illumination device is not currently being used.

In a preferred embodiment, the illumination device comprises a signal-processing control unit. This control unit is able to receive signals from sensors and/or input units of the illumination device, in particular from a distance sensor or from an input unit for user specifications. The control unit is optionally able to read out a data memory with configuration-related properties and/or current settings of the illumination device and to control the main illumination unit and/or the auxiliary illumination unit and thus cause the respective emitted light to change. In particular, this control unit is able to capture or receive and process a specification from a user or also from a higher-level control unit and to automatically adapt at least one illumination unit to the captured/received specification by the control unit driving this illumination unit.

According to the invention, the illumination device is able to capture an illuminance specification (setting). For example, a user specifies how large the achieved maximum illuminance at the reference distance of the illumination device, or the main illumination unit should be relative to the maximum illuminance achievable at the reference distance. Or, a user dims the illumination device, and preferably in a stepwise manner, without necessarily specifying a desired illuminance, thereby reducing the maximum achievable illuminance at the reference distance, and typically in a stepwise manner (gradually).

The control unit captures the illuminance specification and controls at least one illumination unit of the illumination device according to the invention with the objective that the illuminance ratio remains unchanged. The control depends on the captured illuminance specification. In one embodiment one control goal is to fulfill the illuminance specification.

In several embodiments, one objective (control gain) of the control is to keep the influence of the auxiliary illumination unit relatively low, in particular to limit its influence essentially to reducing the contrast and/or illuminating an area outside the main light field. In the following, these embodiments are described.

Various embodiments result in different properties of the $d_x$ light field achieved by the illumination device not being significantly changed when the maximum illuminance that the auxiliary illumination unit is capable of generating and/or the light field diameter are changed, in particular when the auxiliary illumination unit is switched on or off. Various embodiments of how the control unit automatically achieves this objective are described below.

In one embodiment, the control unit is able to automatically determine the maximum illuminance that the main illumination unit generates on the surface and the maximum illuminance that the auxiliary illumination unit generates on the surface. Preferably, the control unit uses the maximum illuminance at the reference distance of the main illumination unit and the maximum illuminance at the reference distance of the auxiliary illumination unit for this purpose. The maximum illuminance at the reference distance is the maximum illuminance that the illumination unit currently achieves at the reference distance and is less than or equal to the maximum achievable illuminance at the reference distance. The maximum illuminance at the reference distance is less than the maximum achievable illuminance when the illumination unit has been dimmed. The maximum achievable illuminance at the reference distance is a configuration-related or pre-measured and usually invariable property of the illumination unit, which is preferably stored in a data memory to which the control unit has read access. The maximum achieved illuminance at the reference distance depends on the maximum achievable illuminance and usually additionally on a variable control and/or setting of the illumination unit. The maximum illuminance achieved on the surface depends on the maximum illuminance achieved at the reference distance and on the distance between the illumination unit and the surface.

According to the invention, the illumination device is able to capture an illuminance specification (setting). This illuminance specification determines which maximum illuminance the illumination device is to achieve at the reference distance. Often, the illuminance specification specifies that the maximum illuminance that the illumination device is to achieve at the reference distance is to be changed. This illuminance specification is transmitted to the control unit.

In many cases, the illumination device produces particularly ergonomic lighting if an illuminance ratio remains unchanged, at least when both illumination units are switched on. In particular, this illuminance ratio remains unchanged when a parameter of the illumination device or of an illumination unit is changed. The illuminance ratio is defined as the ratio between:
the maximum illuminance that the auxiliary illumination unit achieves on the surface, and
the maximum illuminance that the main illumination unit achieves on the surface.

As stated above, this illuminance ratio is between 1% and 15% according to the invention, particularly preferably between 2% and 5%, and at least when the two conditions mentioned above are fulfilled. Of course, the illuminance ratio is only greater than zero when the auxiliary illumination unit is switched on.

According to the embodiment just described, the control unit automatically responds to a specification that the maximum illuminance of the illumination device should assume a certain value, for example a certain percentage of the maximum achievable illuminance or should be increased or decreased. The control unit controls at least one of the two illumination units, the control being a response to the capturing of the illuminance level specification. An objective of the control is that the illuminance ratio remains unchanged, even if the illuminance specification results in a different maximum illuminance to be achieved by the illumination device.

In one implementation, a desired value for the illuminance ratio is stored in a data memory. The control unit has at least intermittent read access to the data memory and determines and uses the stored value for the illuminance ratio, for example when the illumination device is switched on after a pause in operation.

In another implementation, the step of having captured an illuminance specification triggers the steps of the control unit first
the maximum illuminance that the main illumination unit achieves on the surface, and
the maximum illuminance that the auxiliary illumination unit achieves on the surface, and derives the current illuminance ratio from this. This illuminance ratio is stored at least temporarily in a data memory. The control unit controls the main illumination unit and/or the auxiliary illumination unit with the objective of achieving the illuminance specification and keeping the illuminance ratio unchanged despite a change in the maximum illuminance. This other form of realization allows the illuminance ratio to be changed due to another operation, for example as a result of a corresponding explicit instruction from a user to change the contrast.

It is possible that the control unit automatically performs a closed-loop control. The two control objectives in this control are that a specification for the maximum illuminance of the illumination device or the main illumination unit is met and that the specified or determined illuminance ratio is actually achieved. The manipulated variables in the control are the actuations of the two illumination units. The control unit determines at least once and repeatedly if necessary the maximum illuminance levels of the two illumination units achieved on the surface and derives the current illuminance ratio and from this a control deviation.

According to the embodiment just described, the control unit determines the respective maximum illuminance achieved by the main illumination unit and the auxiliary illumination unit on the illuminated surface. In one embodiment, the control unit uses the two maximum illuminances achieved at the reference distance as the illuminances that the two illumination units achieve on the surface. The two maximum illuminances achieved at the reference distance depend on the respective maximum illuminance achievable (two configuration-related properties) and the respective control of the illumination units. For example, the two illumination units are controlled so that the respective maximum illuminance is x % or y % of the maximum achievable illuminance. If the actual distance differs only relatively little from the reference distance, the illuminances on the surface correspond relatively well to the maximum illuminances achieved at the reference distance.

In a preferred embodiment, the illumination device additionally comprises at least one distance sensor that measures an indicator of the distance between itself and the illuminated surface. For example, the distance sensor emits electromagnetic radiation or sound waves that are reflected from the surface and measures the transit time that elapses until the reflected radiation or sound waves reach the distance sensor again. Preferably, the distance sensor measures the indicator of distance at least along or parallel to a central optical axis of the illumination device. However, it is also possible that an angle occurs between the measurement direction of the distance sensor and the optical center axis. Often, a lateral offset occurs between the distance sensor and the optical center axis. The orientation of the measurement direction relative to the optical center axis and the lateral offset are known from the configuration of the illumination device. It is possible that two spaced apart distance sensors are used and an average distance between the illumination device and the illuminated surface is derived from the measured values of these two distance sensors. This embodiment takes into account the possibility that the optical center axis of the illumination device is oblique on the illuminated surface.

The distance measured by the distance sensor applies with sufficient accuracy to both illumination units. As a rule, a functional relationship is known from the respective configuration of an illumination unit or from a test carried out in advance, which determines how the maximum illuminance on the surface depends on the maximum illuminance at the reference distance and the distance between the illumination unit and the surface. The control unit determines the measured distance,
for both the main illumination unit and the auxiliary illumination unit, the maximum illuminance achieved at the reference distance, and
a predetermined or determined functional relationship between the maximum illuminance caused on the surface and the distance.

The maximum illuminance levels achieved at the reference distance and the functional relationship are known from the configuration of the illumination device or from measurements carried out in advance and are preferably stored in a data memory to which the control unit has read access. From this, the control unit derives the respective maximum illuminance on the surface.

The illumination device generates a light field on the illuminated surface with a maximum illuminance and a light field diameter $d_x$, e.g. $d_{10}$. The maximum illuminance of the illumination device on the surface depends on the maximum illuminances of the two illumination units achieved at the reference distance and on the distance between the illumination device and the surface. In many cases, the influence of the distance can be neglected. In other cases, the influence of the distance can be taken into account by calculation, or the distance is measured as just described.

In a first embodiment described below, it is automatically ensured that the maximum illuminance that the illumination device generates on the surface remains unchanged even if the maximum illuminance of the auxiliary illumination unit is changed, in particular as a result of a user input. In a second embodiment, it is automatically ensured that the light field diameter that the illumination device generates on the surface remains constant, even if the light field diameter of the auxiliary illumination unit is changed. These two embodiments can be combined with each other.

According to both embodiments, the auxiliary illumination unit can optionally be operated in a first or in a second state, in particular as a result of a corresponding control by the control unit. For example, the auxiliary illumination unit is switched on in one state and switched off in the other state (maximum illuminance equal to zero). Or the auxiliary illumination unit achieves the maximum achievable illuminance in one state and a lower maximum illuminance in the other state, i.e. is dimmed but not completely switched off in the other state.

In each state, the auxiliary illumination unit generates a maximum illuminance and a light field with a light field diameter on the illuminated surface. In the first embodiment, the maximum illuminance achieved by the auxiliary illumination unit in the first state is different from the maximum illuminance in the second state. In the second embodiment, the light field diameter in the first state is different from the light field diameter in the second state.

Both embodiments, as well as their combination, can be applied when the auxiliary illumination unit is first operated in a first state and then in a different second state, for example, switched on or off or dimmed or turned up or the light field diameter is changed.

According to the first embodiment just described, as well as the combination, the control unit is able to determine which maximum illuminance the illumination device achieves on the surface, with the auxiliary illumination unit being in the first state. Preferably, the control unit uses for this determination the respective maximum illuminance achieved at the reference distance of the two illumination units,
the measured distance between the illumination device and the surface, and
the respective functional relationship between the distance and the maximum illuminance at the reference distance for the two illumination units.

According to the second embodiment as well as the combination, the control unit is able to determine which light field diameter the illumination device achieves on the surface. In one embodiment, it uses the light field diameter at the reference distance for this purpose. The control unit performs this determination while the auxiliary illumination unit is operating in the first state. The control unit captures a specification that the auxiliary illumination unit is to be transferred from the first state to the second state and causes the auxiliary illumination unit to actually be transferred to the second state.

Furthermore, the control unit controls the main illumination unit and, by the control, causes the maximum illuminance (first embodiment) or the light field diameter (second embodiment) that the main illumination unit achieves on the surface to be changed. By actuating, the control unit changes a luminous intensity parameter (first embodiment) or a light field parameter (second embodiment) of the main illumination unit. In one embodiment, the luminous intensity parameter correlates with the maximum illuminance at the reference distance of the main illumination unit, and the light field parameter correlates with the light field diameter at the reference distance. In particular, the control unit changes the maximum illuminance achieved at the reference distance or the light field at the reference distance, the latter for example by switching on or off or otherwise changing individual light sources of the main illumination unit. In the first embodiment, the objective of the control is that after the change, the maximum illuminance achieved by the illumination device on the surface is equal to the previously determined maximum illuminance.

As mentioned above, in many cases the auxiliary illumination unit changes the contrast achieved by the illumination device compared to an illumination device without an auxiliary illumination unit according to the invention. The maximum illumination level of the auxiliary illumination unit also affects the contrast. The contrast of the illumination device is preferably defined as $Ev_{max}/Ev(x*d_{10})$, where $Ev_{max}$ denotes the maximum illuminance of the illumination device according to the invention on the illuminated surface and $Ev(x*d_{10})$ denotes the average illuminance on a circle with diameter $x*d_{10}$. The factor x is greater than 1. Preferably, the factor x is between 1.5 and 3 and is particularly preferably equal to 2. The contrast is thus the ratio of the maximum illuminance on the surface and the mean illuminance on the surface in a circle, the center of this circle being a point of maximum illuminance and the diameter of this circle being greater than the light field diameter $d_{10}$. In one embodiment, the contrast used is the ratio of the maximum illuminance at the reference distance and the average illuminance at the reference distance on the circle with diameter greater than the light field diameter $d_{10}$. In many cases, the contrast depends relatively little on the distance between the illumination device and the surface.

In one embodiment, a user can specify a default for a desired contrast of the illumination device, in particular change it step by step. For example, the user can specify that the contrast should be increased or decreased. The control unit captures this specification for the desired contrast and controls at least one illumination unit, preferably the auxiliary illumination unit, in such a way that the illumination device according to the invention achieves the desired contrast.

Preferably, the signal-processing control unit controls the auxiliary illumination unit in such a way that the maximum illuminance and/or the light field diameter of the auxiliary illumination unit is changed, and the desired contrast is achieved by the change. It is also possible that only the maximum illuminance of the auxiliary illumination unit can be changed, but not its light field diameter. Preferably, the control and settings of the main illumination unit remain constant, while the control unit causes the contrast achieved by the illumination device to be changed.

It is possible that a user may want to change the contrast of the illumination device, but the light field diameter and/or the maximum illuminance on the surface should remain unchanged, even if the contrast is changed. In one embodiment, the control unit captures the specification regarding the contrast. On the one hand, the control unit controls the auxiliary illumination unit with the objective of ensuring that, as a result of the control, the illumination device actually achieves the desired contrast. Preferably, a further objective of the control by the control unit is that the light field diameter and/or the maximum illuminance on the surface remain unchanged.

A preferred form of implementation to achieve the two control objectives or regulatory goals just mentioned is as follows:

The control unit captures a desired value for the contrast of the illumination device, where the contrast is defined as described above as $Ev_{max}/Ev(x*d_{10})$ with x>1.

The control unit determines the contrast currently achieved by the illumination device.

The contrast achieved is significantly influenced by the auxiliary illumination unit. To change the contrast achieved, the control unit causes the maximum illuminance of the auxiliary illumination unit to be changed.

If the maximum illuminance achieved by the illumination device on the surface is to remain unchanged, the control unit also causes the maximum illuminance of the main illumination unit to be changed. A boundary condition for this change is that the determined contrast is maintained.

If the light field diameter of the illumination device is to remain unchanged, the control unit additionally causes the light field diameter of the main illumination unit to be changed. Again, a boundary condition is that the determined contrast is maintained.

A desired approach to implement the above is as follows: According to the invention, the auxiliary illumination unit comprises a plurality of groups of light sources, each group comprising at least one light source. The maximum illuminance achieved by one group of light sources of the auxiliary illumination unit can be varied independently of the respective maximum illuminance of each other light source group of the illumination device. In one embodiment, the light field diameter achieved by a light source group of the auxiliary illumination unit can also be changed independently of the respective light field diameter of each other light source group. The control unit is able to control each light source group individually.

The main illumination unit emits light in a light spectrum. The auxiliary illumination unit emits light in a light spectrum. The respective light spectrum of these two illumination units is composed of the light spectra of the light sources of this illumination unit. Each light spectrum is correlated with a respective color temperature. Preferably, the correlated color temperature of the auxiliary illumination unit differs from the correlated color temperature of the main illumination unit by at most 500 Kelvin, particularly preferably by at most 200 Kelvin, especially by at most 50 Kelvin.

Due to this configuration, the two illumination units usually create the impression for an observer that they have the same color temperature. One reason for this is that the human eye is usually only able to distinguish color temperatures from one another when there is a difference of at least 500 Kelvin. If two illumination units have the same illuminance, a human eye can often distinguish color temperatures as low as 200 Kelvin. However, the two illumination units of the illumination device according to the invention have different illuminance levels.

In one embodiment, the control unit captures a specification for the light spectrum of the main illumination unit or that of the illumination device, for example a specification for a desired correlated color temperature. Preferably, the user specifies a default for the light spectrum, in particular the correlated color temperature, of the illumination device, and the control unit uses this default as the default for the main illumination unit. The control unit causes the light spectrum of the main illumination unit to be changed according to the specification.

According to this embodiment, the control unit also changes the light spectrum of the auxiliary illumination unit. Preferably, the correlated color temperatures of the two illumination units differ from each other by no more than 500 Kelvin, particularly preferably by no more than 200 Kelvin. Preferably, the control unit changes the light spectrum of the auxiliary illumination unit in such a way that the absolute or percentage difference between the two color temperatures remains unchanged, even if the color temperature of the main illumination unit is changed.

Preferably, the auxiliary illumination unit comprises at least two light sources, referred to as auxiliary light sources. Particularly preferably, the light sources of the auxiliary illumination unit have a total of at least two different light spectra and therefore also at least two different correlated color temperatures. Preferably, the control unit automatically changes the light spectrum of the auxiliary illumination unit by causing the control unit to change the maximum illuminance of at least one light source, but not each light source, of the auxiliary illumination unit. For example, the control unit alters the applied electrical voltage or electrical current intensity or, in the case of pulsed operation, the pulse width or pulse frequency. In particular, if the light sources of the auxiliary illumination unit are configured as LEDs, the control unit preferably causes the change of the maximum illuminance by pulse width modulation. Here, the ratio between the duration of a pulse, i.e. a period of time during which electric current flows through the light source, and the duration of a period of time between two successive pulses is changed.

In one embodiment, the correlated color temperature of the auxiliary illumination unit is at least 500 Kelvin, preferably at least 1000 Kelvin, lower than the correlated color temperature of the main illumination unit. This embodiment leads in many cases to a particularly ergonomic irradiation of the surface.

Preferably, the auxiliary illumination unit comprises at least two light sources, referred to as auxiliary light sources. Each auxiliary light source emits a respective light beam and has a respective optical center axis. Each optical center axis intersects the surface at an intersection point. This intersection point is referred to below as an "auxiliary intersection point". As a rule, each auxiliary light source achieves the maximum illuminance at its associated auxiliary intersection point because its light beam is rotationally symmetric with respect to the optical center axis of the light source. The intersection point between the optical center axis of the illumination device and the illuminated surface is called the "main intersection point". As a rule, the main illumination unit achieves the maximum illuminance at the main intersection point.

In one embodiment, the auxiliary illumination unit also generates the maximum illuminance at the point of intersection of the optical center axis with the surface, i.e., at the main intersection point. This is preferably achieved by the main intersection point and all additional intersection points coinciding.

In another embodiment, a distance occurs between the point or each point at which the auxiliary illumination unit generates its maximum illuminance on the surface, on the one hand, and the main intersection point, on the other hand. This is preferably achieved by a distance occurring between the at least one, preferably each, additional intersection point and the main intersection point, respectively. This feature is preferably achieved for each distance between the illumination device and the illuminated surface that lies within the distance range.

In one implementation, the auxiliary illumination unit is configured to achieve the maximum illuminance in at least one auxiliary intersection point, i.e., the maximum illuminance of the auxiliary illumination unit is equal to the maximum illuminance of the associated light source. It is possible that the auxiliary illumination unit achieves the same maximum illuminance in each auxiliary intersection. It is also possible that the maximum illuminance of the auxiliary illumination unit occurs between two adjacent auxiliary intersections. With a distance between each additional intersection point and the main intersection point, the light field of the auxiliary illumination unit does not have the shape of a bell curve, but rather that of a volcano cone.

Preferably, the illuminance achieved by a light source of the auxiliary illumination unit at the additional intersection point assigned to it, i.e. the maximum illuminance, is between 1% and 15%, particularly preferably between 2% and 5%, of the maximum illuminance of the main illumination unit, usually the illuminance achieved by the main illumination unit at the main intersection point. This again preferably applies for each distance in the distance range.

Preferably, the auxiliary illumination unit has at least three auxiliary intersections, and the auxiliary intersections delineate an area on the illuminated surface. The main intersection point is located inside this bounded area.

This configuration results, to a particularly high degree, in the auxiliary illumination unit having little effect on the relatively small $d_x$ field of light of the main illumination unit but providing additional illumination of the surface outside the $d_x$ field of light of the main illumination unit.

In a preferred use, the illumination device according to the invention is used to illuminate an operating table. This operating table is configured for a patient to lie on and receive medical treatment. Typically, this operating table is located in an enclosed space in a building or in a vehicle, and the operating table is illuminated exclusively or predominantly by the illumination device, optionally additionally by at least one light source on a ceiling or wall of the space, but only slightly by daylight. The surface of a patient lying on the operating table facing the illumination device generally functions as the illuminated surface.

In the following, the invention is described by means of embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
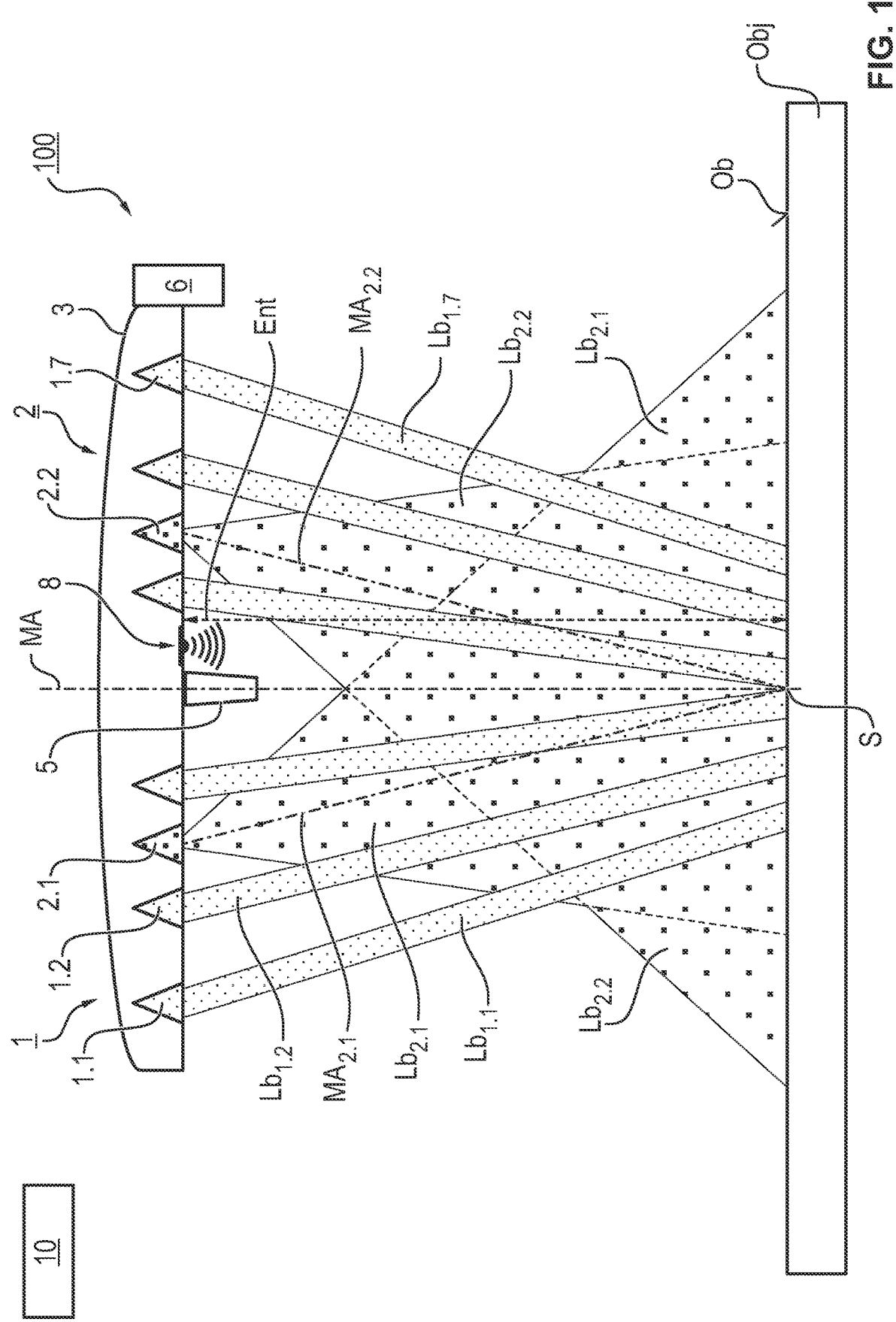
FIG. 1 is a schematic cross-sectional view of a first embodiment of the illumination device according to the invention, wherein the optical center axis lies in the drawing plane.
Figure 3:
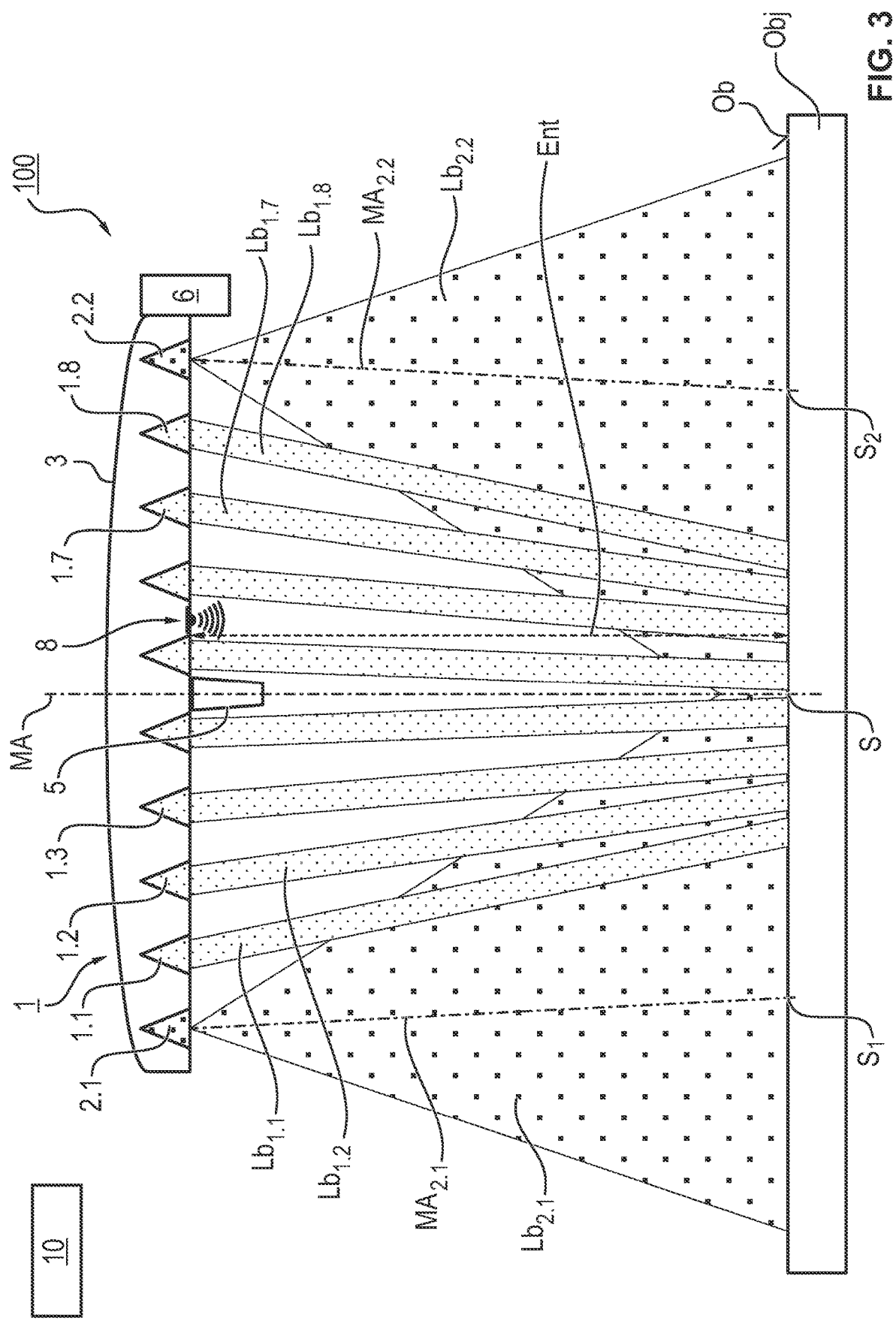
FIG. 3 is a schematic cross-sectional view of a second embodiment of the illumination device according to the invention, wherein the optical center axis lies in the drawing plane.

Referring to the drawings, in an embodiment, an illumination device 100 according to the invention is used to illuminate an object Obj, in this case a medical operating table, cf. FIG. 1 and FIG. 3. On this operating table Obj lies a patient who is not shown and who is receiving medical treatment. A surface Ob of the illuminated object Obj faces the illumination device 100 and is therefore illuminated. When a patient is lying on the operating table Obj, at least a portion of the surface of the patient facing the illumination device 100 is illuminated. For simplicity, a flat illuminated surface Ob is shown in the figures.

The illumination device 100 comprises a carrier 3, which is preferably rotationally symmetrical to an optical center axis MA of the illumination device 100. The carrier 3 is movably attached to a ceiling by means of a carrier unit not shown. A handle 5 is attached centrally to the carrier 3, which points towards the illuminated surface Ob.

In addition, an optional distance sensor 8 is mounted on the carrier 3 to measure the distance between itself and the illuminated surface Ob. For example, the distance sensor 8 emits electromagnetic waves or sound waves that are reflected from the surface Ob and reach the distance sensor 8 again, and the distance sensor 8 measures the travel time. The lateral offset between the distance sensor 8 and the optical center axis MA, as well as the measurement direction of the distance sensor 8 relative to the optical center axis MA, are known by the configuration of the illumination device 100. A signal-processing control unit 10, shown only schematically, derives the sought distance Ent between the carrier 3 and the surface Ob from the measurement results of the distance sensor 8 and the configuration-related lateral offset and angle. In the embodiment example, it is assumed with sufficient accuracy that the optical center axis MA is perpendicular to the flat illuminated surface Ob.

FIG. 1 and FIG. 3 schematically show two embodiments of the illumination device 100. The optical center axis MA lies in the drawing planes of FIG. 1 and FIG. 3, and the illuminated surface Ob of the operating table Obj is perpendicular to these drawing planes. The central axis MA intersects the surface Ob at an intersection point S. This intersection point S is hereinafter referred to as the "main intersection point".

The illumination device 100 includes a plurality of individual light sources, described in more detail below.

The illumination device 100 comprises a main illumination unit 1 having a first set of light sources. The light sources of the main illumination unit 1 are preferably arranged rotationally symmetrically around the center axis MA and are referred to as main light sources. It is also possible that the main light sources are not arranged rotationally symmetrically.

FIG. 1 and FIG. 3 show examples of seven main light sources 1.1, 1.2, . . . , 1.7 of the main illumination unit 1. The figures are not necessarily to scale. In addition, the seven light beams $Lb_{1.1}$, $Lf_{1.7}$ of these seven main light sources 1.1, 1.2, . . . , 1.7 are shown as examples. Each main light source 1.1, 1.2, . . . , 1.7 emits light in a relatively narrow light beam $Lb_{1.1}$, $Lb_{1.7}$, i.e. with a relatively small light divergence angle. The superposition of the light beams $Lb_{1.1}$, $Lb_{1.7}$ provides the illumination by the main illumination unit 1.

Note: In FIG. 1 and FIG. 3 the light beams $Lb_{1.1}$, $Lb_{1.7}$ do not overlap. It is also possible that the light beams $Lb_{1.1}$, $Lb_{1.7}$ overlap, preferably with at least half of the extent of the respective light field, or even that all main light sources 1.1, 1.2, . . . , 1.7 illuminate the same area on the surface Ob.

The light sources of the illumination device 100 generate a total light field on an illuminated surface Ob, which is perpendicular or oblique to the center axis MA. This total light field has a center, namely the main intersection point S, i.e. the intersection point of the optical center axis MA with the illuminated surface Ob.

In one embodiment, the total light field on the surface Ob has a region of maximum illuminance around a center of the total light field, preferably around the main intersection point S. Outwardly, i.e., with increasing distance from this region of maximum illuminance, the illuminance decreases, for example, similar to a three-dimensional bell curve that is rotationally symmetric about the optical center axis MA. Preferably, the light field generated by the main illumination unit 1 on the surface Ob has such a shape. It is also possible that the light field of an auxiliary illumination unit 2 described in more detail below also has such a shape. However, it is also possible that the auxiliary illumination unit 2 achieves the maximum illuminance at several points of a closed curve, in particular a circle or other ellipse, around the main intersection point S, and the illuminance decreases again in the interior of the closed curve, i.e. toward the main intersection point S.

Preferably, the illumination device 100 comprises a capturing device (data entry/input interface) 6 shown schematically that is capable of capturing various user specifications (inputs). The capturing device 6 is mounted on the side of the carrier 3 in the implementation shown. Thanks to this embodiment, a user can simultaneously operate the capturing device 6 and look at the illuminated surface Ob. With the aid of this capturing device 6, a user can enter required or desired values for various parameters of the illumination device 100.

One parameter is the light field diameter to be achieved $d_x$. Preferably, a value specified by the user refers to the parameter light field diameter $d_x$ with x=10% and to a reference distance of e.g. 1 m between the illumination device 100 and the illuminated surface Ob. Two further parameters are the maximum achieved illuminance, e.g. also at the reference distance or in the room, and the light spectrum or correlated color temperature of the emitted light, furthermore the contrast. The set maximum achieved (more precisely: to be achieved) illuminance at the reference distance is smaller than or equal to the maximum achievable illuminance at the reference distance and larger than or equal to the maximum illuminance which is achieved on the surface Ob. For example, a user can reduce the maximum achieved illuminance by dimming or increase it by turning it up. Typically, the user does not directly specify a value for each of these parameters, but instead specifies a value on a stepless or stepped scale of, for example, 1 to 10.

In one embodiment, the parameters for which the user can specify values relate to the illumination device 100 and act on the main illumination unit 1. The effects of a user specification on the auxiliary illumination unit 2 is described further below. It is also possible that at least one parameter acts on the entire illumination device 100.

In the example shown, the main light sources 1.1, 1.2, . . . , 1.7 of the main illumination unit 1 illuminate a relatively small area on the illuminated surface Ob. Preferably, $2*d_{50} > d_{10}$.

Figure 2:
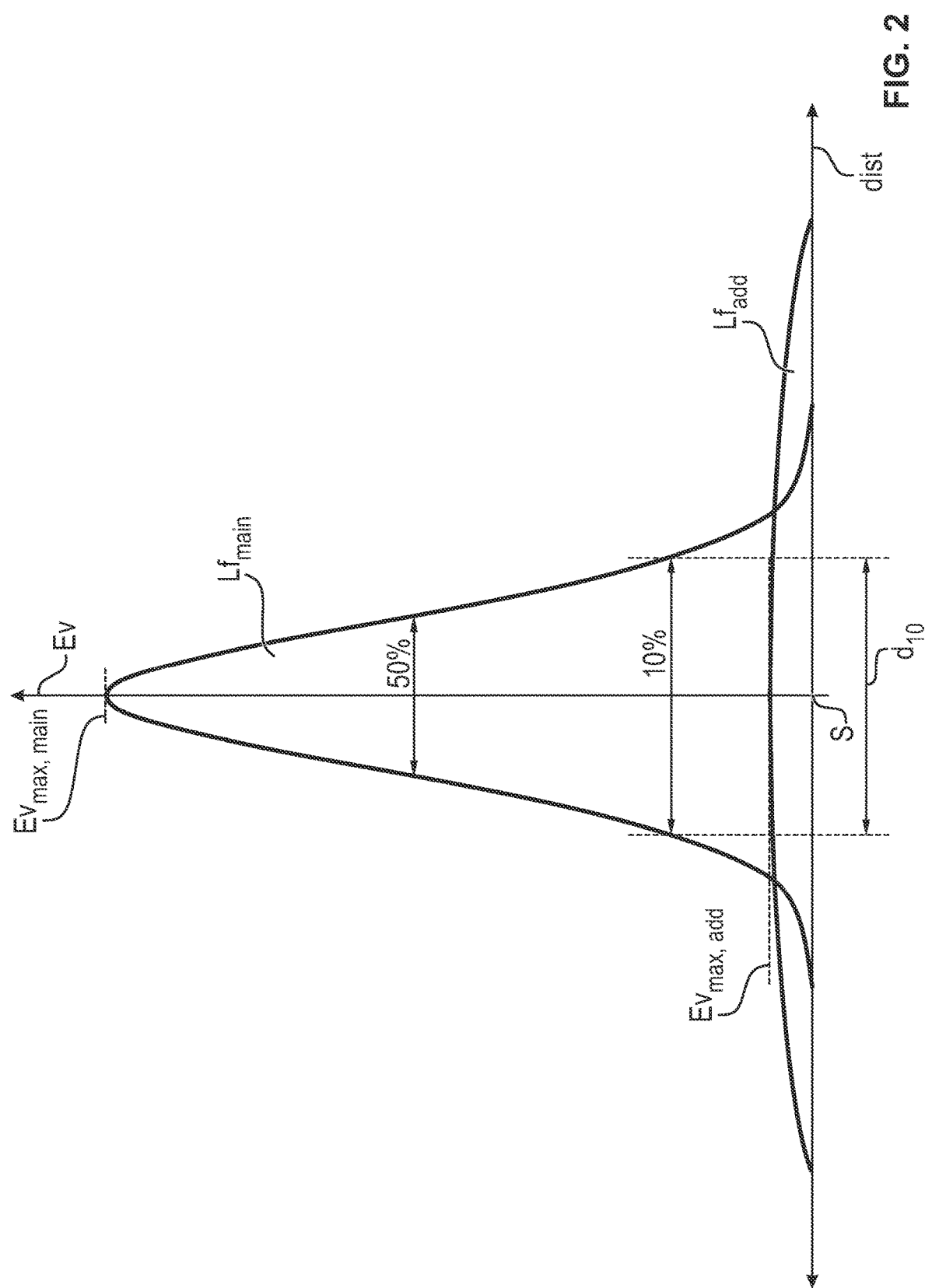
FIG. 2 is a schematic showing of the main light field and the auxiliary light field according to the first embodiment shown in FIG. 1.

FIG. 2 schematically shows a diagram of the two light fields generated by the two illumination units 1 and 2 of FIG. 1, where on the x-axis the distance dist between the main intersection point S of the center axis MA with the illuminated surface Ob on the one hand and a point on the illuminated surface Ob on the other hand is plotted. On the y-axis is plotted a measure of the generated illuminance Ev on the surface Ob. This illuminance Ev has the form of a rotationally symmetric bell curve around the main intersection point S. At the main intersection point S, the main illumination unit 1 generates the maximum illuminance $Ev_{max,main}$. The bell curve describing the light field of the main illumination unit 1 is denoted by $Lf_{main}$. The light field diameter $d_{10}$ of the light field $Lf_{main}$ is entered. In the illumination device 100 that illuminates an operating table Obj, the light field diameter $d_{10}$ is preferably between 13 cm and 35 cm. Furthermore, the light field diameter d 50 is entered, which is the diameter of the circle around S with x=50% of the maximum illuminance. Preferably, d 50 is at least half as large as $d_{10}$. Particularly preferably, the main illumination unit 1 complies with the IEC 60601-2-41 standard for surgical lights, which specifies that the light field is relatively small and relatively sharply defined—specifically, that $2*d_{50} > d_{10}$ applies.

On the one hand, it is often required or at least desired to focus the light emitted by the illumination device 100 particularly well on a specific area. In this way, only the area in which medical treatment is to take place is illuminated. In addition, in many cases strong focusing saves consumed electrical energy and generated radiant energy. On the other hand, a very high contrast between an illuminated and a non-illuminated area can cause a treating physician's eyes to tire quickly as the eyes move between a strongly and a less strongly illuminated area. It is even possible that the eyes are blinded and hurt as a result.

Too high a contrast can also result in areas of the patient on the operating table not being seen clearly enough in images from a camera, this camera being pointed at the operating table and the images being displayed on an output unit. Such an arrangement is used, for example, to train medical students. It is true that such a camera often has an automatic brightness setting. However, this automatic brightness setting often cannot fully follow a large contrast. As a result, some cameras fail to correctly capture a high-contrast image. Either the unlit edge area is too dark, or the center is too bright.

The contrast Kon achieved by the illumination device 100 can be referred to as the ratio between the maximum illuminance $Ev_{max}$ on the illuminated surface Ob and the average illuminance on the circle of diameter $x*d_{10}$, i.e. $Kon = Ev_{max}/Ex(x*d_{10})$ with x>1. In the embodiment example x=2 is used, i.e. the contrast is $Kon = Ev_{max}/Ex(2*d_{10})$. The contrast Kon in conventional illumination devices is often between 50 and 400. The light field Lf mam, which the main illumination unit 1 of the illumination device 100 according to the invention achieves, also preferably has such a large contrast Kon. In one embodiment, the contrast Kon is a further parameter of the illumination device 100 according to the invention. This parameter Kon can be varied independently of the light field diameter $d_x$.

As a rule, a high contrast Kon is desired. Sometimes, however, the contrast Kon is to be reduced at least temporarily. For this reason in particular, the illumination device 100 comprises, in addition to the main illumination unit 1, an auxiliary illumination unit 2 comprising at least one auxiliary light source, preferably several auxiliary light sources. The auxiliary light sources are also mounted in the carrier 3. In the embodiment example, the positions and orientations of the auxiliary light sources cannot be changed relative to the positions and orientations of the main light sources. In FIG. 1 and FIG. 3, two auxiliary light sources 2.1 and 2.2 are shown as examples. The auxiliary illumination unit 2 can preferably be switched on and off independently of the main illumination unit 1. In one embodiment, a user can turn the auxiliary illumination unit 2 on and off, and in another embodiment, the control unit 10 can do so automatically. It is possible that both a user and the control unit 10 can turn the auxiliary illumination unit 2 on and off.

FIG. 2 shows an example of the illuminance Ev achieved by the auxiliary illumination unit 2 on the illuminated surface Ob. The distance between a point on the surface Ob and the main intersection point S is plotted on the x-axis, and the respective illuminance at this point is plotted on the y-axis. At the main intersection point S, the auxiliary illumination unit 2 in the embodiment according to FIG. 1 achieves the maximum illuminance $Ev_{max,add}$. Shown is the curve $Lf_{add}$ for the light field $Lf_{add}$ from the auxiliary illumination unit 2. It can be seen that the auxiliary illumination unit 2 illuminates a larger area of the surface Ob than the main illumination unit 1, and this in a central area with a lower illuminance. More precisely, each light field diameter $d_x$ of the main illumination unit 1 lies concentrically in the corresponding light field diameter $d_x$ of the auxiliary illumination unit 2 in the example shown.

Each auxiliary light source 2.1, 2.2 emits light with a relatively wide conical light beam $Lb_{2.1}$, $Lb_{2.2}$, cf. FIG. 1 and FIG. 3. The light beam $Lb_{2.1}$, $Lb_{2.2}$ is rotationally symmetrical to a center axis $MA_{2.1}$ and $MA_{2.2}$, respectively. In the embodiment according to FIG. 1, the central axes MA, $MA_{2.1}$ and $MA_{2.2}$ of the main illumination unit 1 and of the auxiliary light sources 2.1 and 2.2 intersect the illuminated surface Ob at the same main intersection point S. In the embodiment according to FIG. 3, however, the center axes MA, $MA_{2.1}$ and $MA^{2.2}$ intersect the illuminated surface Ob at three spaced-apart intersection points S, $S_1$ and $S_2$, respectively. The two intersection points $S_1$ and $S_2$ are referred to as "auxiliary intersection points". The two auxiliary light sources 2.1 and 2.2 respectively generate their maximum illuminance at the auxiliary intersection points $S_1$ and $S_2$. This coincident maximum illuminance is equal to the maximum illuminance $Ev_{max}$,add of the auxiliary illumination unit 2 and is between 1% and 15%, preferably between 2% and 5%, of the maximum illuminance $Ev_{max,main}$ of the main illumination unit 1. The distance between two different auxiliary intersections $S_1$, $S_2$ may be larger or smaller than the distance between the illumination device 100 and the illuminated surface Ob. The maximum illuminance $Ev_{max,add}$ of the light field obtained by the auxiliary illumination unit 2 according to FIG. 3 on the illuminated surface Ob occurs in a circular ring around the main intersection point S, the two auxiliary intersection points $S_1$ and $S_2$ lying on this circular ring. In one embodiment, the two additional intersection points $S_1$ and $S_2$ lie on the light field diameter $d_{10}$ of the main illumination unit 1. If the illumination device 100 illuminates the surface Ob obliquely from above, the additional intersection points preferably form an ellipse.

Figure 4:
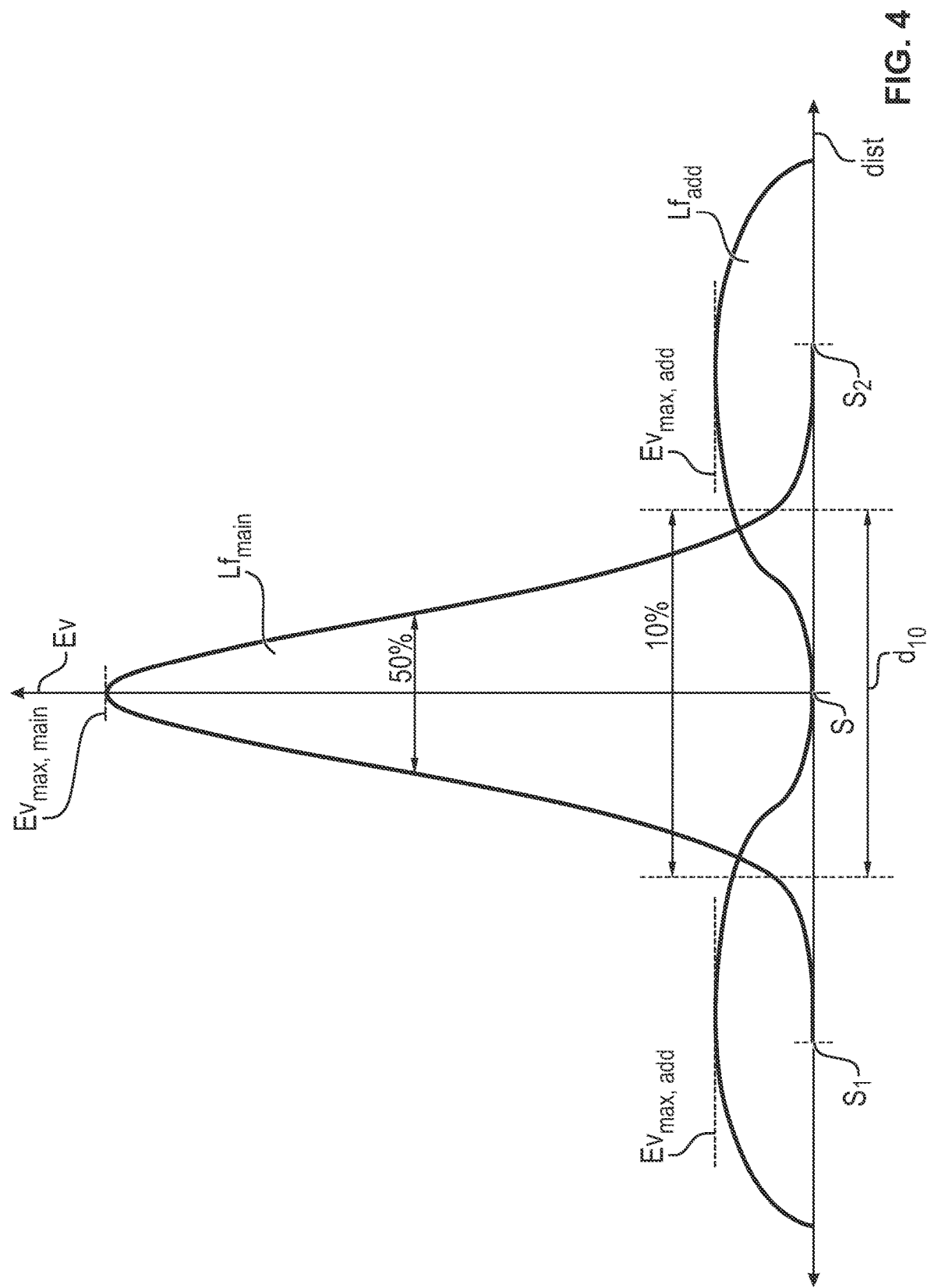
FIG. 4 is a schematic showing of the main light field and the auxiliary light field according to the second configuration shown in FIG. 3.

FIG. 4 schematically shows which light field $Lf_{add}$ the auxiliary illumination unit 2 generates on the surface Ob in the configuration according to FIG. 3. The light field Lf main of the main illumination unit 1 is the same as in the configuration according to FIG. 1. FIG. 4 shows the two additional intersection points $S_1$ and $S_2$.

It is also possible that the two center axes $MA_{2.1}$ and $MA_{2.2}$ of the auxiliary light sources 2.1 and 2.2 do not intersect and/or do not intersect the center axis MA of the main illumination unit 1, but two center axes are skewed to each other.

In FIG. 2 and FIG. 4 it can be seen that the maximum illuminance $Ev_{max,add}$ of the auxiliary illumination unit 2 is considerably smaller than the maximum illuminance $Ev_{max,main}$ of the main illumination unit 1. Preferably, the maximum illuminance $Ev_{max,add}$ of the auxiliary illumination unit 2 is between 1% and 15%, preferably between 2% and 5%, of the maximum illuminance $Ev_{max,main}$ of the main illumination unit 1. Due to this feature, the auxiliary illumination unit 2 does not significantly change the light field diameter $d_x$, i.e. the light field diameter $d_x$ of the illumination device 100 does not change in a perceptible way when the auxiliary illumination unit 2 is switched on or off.

When the auxiliary illumination unit 2 is switched on, the contrast Kon achieved by the illumination device 100, which is preferably defined as described above, is smaller than when the auxiliary illumination unit 2 is switched off, preferably by at least a factor of 1.5, particularly preferably by at least a factor of 10. In particular, the following configuration-related parameters of the auxiliary illumination unit 2 can be used to influence the contrast achieved by the illumination device 100 when the auxiliary illumination unit 2 is switched on:
the divergence angle and thus the light field diameter $d_x$,
the orientation relative to the main illumination unit 1 and
the maximum illuminance.

The main illumination unit 1 and the auxiliary illumination unit 2 can preferably be switched on and off independently of each other. It is possible to switch off the main illumination unit 1 and use only the auxiliary illumination unit 2. Lighting only by the auxiliary illumination unit 2 can be used, for example, to illuminate a room when no operation is currently being performed, to perform work with an endoscope, or to prepare for or follow up on an operation.

As already explained, a user can specify a value for the maximum illuminance of the main illumination unit 1, for example as a percentage of the maximum possible illuminance. This user specification results in a value for the achieved maximum illuminance $Ev_{max,main}$. In one embodiment, the user may further specify a value for the maximum illuminance $Ev_{max,add}$ of the auxiliary illumination unit 2, for example as a percentage of the maximum possible illuminance of the auxiliary illumination unit 2. This user specification results in a value for the achieved maximum illuminance $Ev_{max,add}$. For example, a default value for the illuminance ratio, which is the ratio between the maximum auxiliary illuminance and the maximum main illuminance, is stored, and the user may use or change this default value. The default value for the illuminance ratio is preferably less than 10%, especially preferably less than 5%.

The control unit 10 of the illumination device 100 receives the predetermined values for the parameters of the illumination device 100 and automatically adjusts the auxiliary illumination unit 2 so that the ratio auxiliary lighting intensity to main lighting intensity is always equal to the predetermined value. In particular, the control unit 10 causes the maximum illuminance of the auxiliary illumination unit 2 to be changed when a user specifies a different value for the maximum illuminance of the main illumination unit 1. In one embodiment, the control unit 10 is capable of changing the electrical voltage applied to the auxiliary light sources 2.1, 2.2 or the magnitude of the current flowing through the auxiliary light sources 2.1, 2.2. In a preferred implementation form, the control unit 10 is capable of performing a pulse width modulation or changing a pulse width or a pulse frequency of an applied pulsed voltage. Both measures have the effect that the actual illuminance of an auxiliary light source 2.1, 2.2 is changed in a controlled manner. It is also possible that only the respective light intensity of some auxiliary light sources is changed, but not that of all auxiliary light sources.

As explained above, a user can specify a value for the maximum illuminance at the reference distance of the main illumination unit 1, for example, by gradually increasing or decreasing the illuminance. Furthermore, a user can turn on and turn off the auxiliary illumination unit 2. In one embodiment, the predetermined value for the maximum illuminance $Ev_{max,main}$ of the main illumination unit 1 is used as an upper bound for the maximum illuminance of the entire illumination device 100. If initially the auxiliary illumination unit 2 is switched off and later the user switches the auxiliary illumination unit 2 on, the control unit 10 preferably causes the maximum illuminance and thus the maximum illuminance $Ev_{max,main}$ of the main illumination unit 1 to be reduced, such that the sum $Ev_{max,main}+Ev_{max,add}$ of the two maximum illuminances is equal to the value specified by the user.

Preferably, the auxiliary illumination unit 2 achieves the same light spectrum and therefore the same correlated color temperature as the main illumination unit 1. In one embodiment, a user can set and change the light spectrum of the main illumination unit 1. The control unit 10 automatically controls the auxiliary light sources 2.1, 2.2 such that the switched-on auxiliary illumination unit 2 always achieves the same light spectrum as the main illumination unit 1.

In one implementation, the auxiliary light sources 2.1, 2.2 can only be switched on and off together. Alternative implementations are described below with reference to FIG. 5. The light spectrum of the auxiliary illumination unit 2 is mixed from the light spectra of the auxiliary light sources 2.1, 2.2. Generally, the light spectrum of the illumination device 100 is mixed from the light spectra of the main light sources 1.1, 1.2, . . . and the light spectra of the auxiliary light sources 2.1, 2.2. In a central region around the central axis MA, the light spectrum obtained by the illumination device 100 is determined almost exclusively by the light spectra of the main light sources 1.1, 1.2, . . . , and in a region around this central region it is determined predominantly by the light spectra of the auxiliary light sources 2.1, 2.2. In one realization form, the light spectra of the auxiliary light sources 2.1, 2.2 differ only so little from the light spectra of the main light sources 1.1, 1.2, . . . that the course of the light spectrum is approximately constant over the entire illuminated area. Preferably, the correlated color temperatures differ from each other by at most 500 Kelvin. In another implementation form, the auxiliary light sources 2.1, 2.2 emit warmer light than the main light sources 1.1, 1.2, . . . , which in many cases is easier on the eyes.

In one implementation form, the main illumination unit 1 comprises two types of main light sources. The main light sources of a first type are capable of emitting warm white light and have, for example, the parameters 2,700 Kelvin color temperature and 400 mA maximum current. The main light sources of a second type are capable of emitting cold white light and have the parameters 6,500 Kelvin color temperature and 600 mA maximum current. In one realization form, the strength of the current flowing through the main light sources of the first kind and the strength of the current flowing through the main light sources of the second kind can be changed independently of each other. In a preferred realization form, pulse width modulation can be performed and/or the respective pulse width and/or pulse frequency of the current can be changed, ideally for the main light sources of the first kind and the second kind independently of each other. In another realization form, the electrical voltage applied to the main light sources of the first kind and the electrical voltage applied to the main light sources of the second kind can be changed independently of each other. To adjust the light spectrum of the main illumination unit 1 to a desired light spectrum, the control unit changes the voltage applied to the main light sources of the first kind and/or the voltage applied to the main light sources of the second kind. Or the control unit changes the current or pulse width of the main light sources of the first kind and/or the second kind. For example, the auxiliary light sources also have the parameters 2,700 Kelvin/6,500 Kelvin and 400 mA/600 mA or other parameters than the main light sources.

Figure 5:
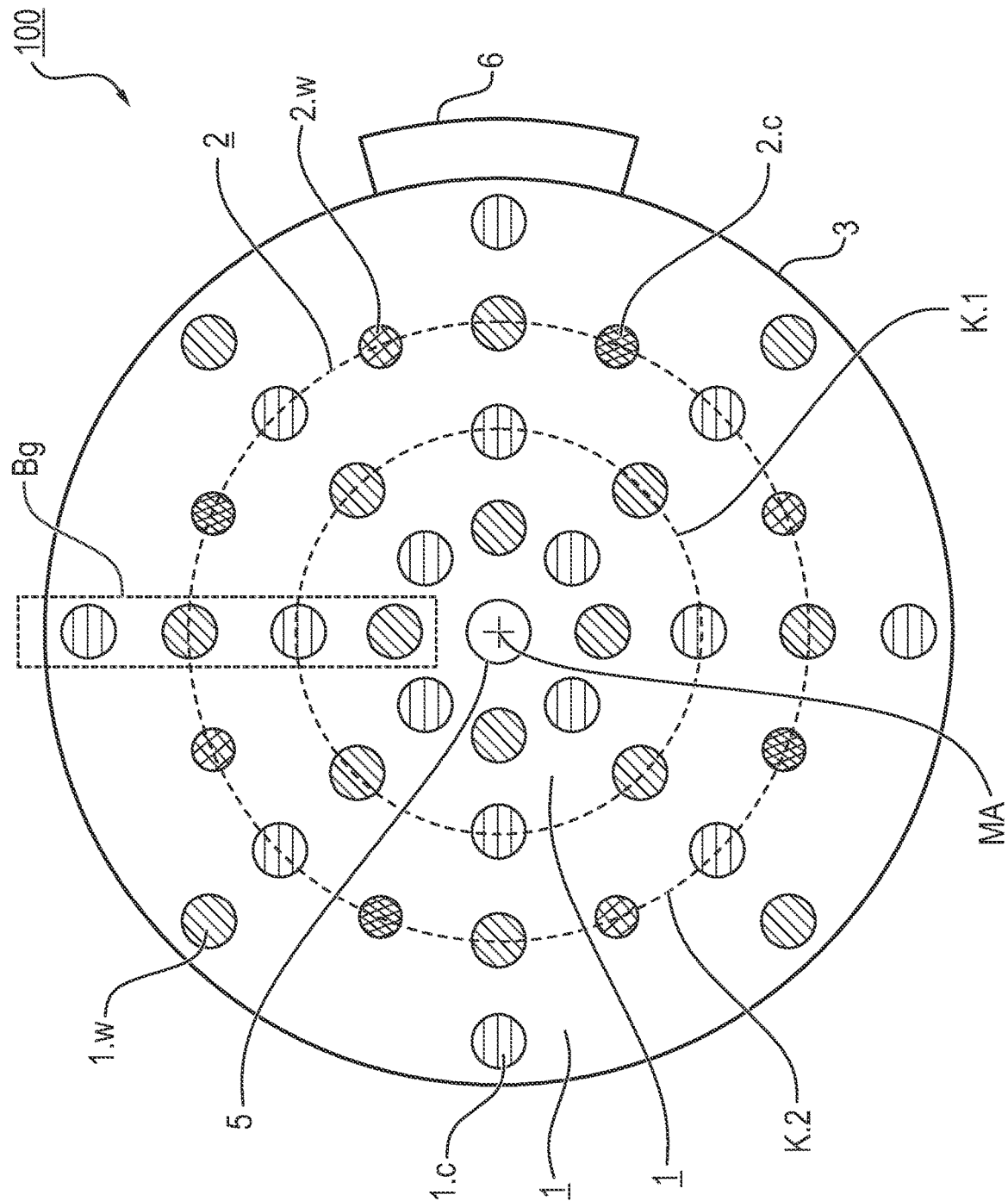
FIG. 5 is a schematic view of a third embodiment of the illumination device according to the invention, wherein the optical center axis is perpendicular to the drawing plane.

FIG. 5 shows an exemplary schematic representation of a third embodiment of the illumination device 100 according to the invention. The center axis MA is perpendicular to the drawing plane, and an observer looks along the center axis MA at the light sources and the carrier 3. A patient on the operating table Obj sees the illumination device 100 approximately as shown in FIG. 5. Those main light sources that emit warm white light are labeled 1.w, and those main light sources that emit cool white light are labeled 1.c. Those auxiliary light sources that emit warm white light are labeled 2.w, and those auxiliary light sources that emit cool white light are labeled 2.c. In the schematic diagram, the auxiliary light sources are smaller and have larger hatching than the main light sources. The direction of the hatching distinguishes the light sources with warm white light from the light sources with cool white light. Furthermore, in one embodiment, a schematically shown handle 5 is arranged in the center of the carrier 3, facing the viewer.

In the example shown, the main light sources are arranged in several concentric circles K.1, K.2 around the handle 5, each circle comprising respectively several warm white and several cool white main light sources 1.w, 1.c, alternately one warm white and one cool white main light source. The auxiliary light sources 2.w, 2.c are arranged in a circle K.2 around the handle 5, namely always alternately one warm white and one cool white auxiliary light source. The main light sources are divided into eight assemblies, including the assembly Bg shown as an example. Each assembly consists of four main light sources, namely alternately two cool white and two warm white, which are arranged in a row, the eight assemblies radiating from the optical center axis MA.

The main light sources are divided into several light source groups, where each light source group can be controlled independently of any other light source group. In one implementation form, each assembly forms one light source group. In another implementation, the cool white light source 1.c of an assembly forms a first light source group and the warm white light sources 1.w of the same assembly form a second light source group. In the example of FIG. 5, the main illumination unit 1 thus comprises eight light source groups in the first realization form and 16 light source groups in the second realization form. It is also possible that each light source of the main illumination unit 1 can be controlled individually.

In one implementation, the light sources of the auxiliary illumination unit 2 can only be controlled together, thus forming a single light source group. In another implementation form, the cold white light sources 2.c in the auxiliary illumination unit 2 form a first light source group and the warm white light sources 2.w form a second light source group. It is also possible that each light source of the auxiliary illumination unit 2 can be controlled individually.

In one embodiment, the two illumination units 1, 2 are adjusted in advance and thereby calibrated. During the adjustment, in particular the respective brightness and the respective light spectrum of the two illumination units are set. Preferably, the adjustment is performed in such a way that the auxiliary illumination unit 2 always achieves the same light spectrum as the main illumination unit 1. Furthermore, preferably, the adjustment is performed in such a way that the ratio between the maximum illuminance of the auxiliary illumination unit 2 is equal to a predetermined percentage of the maximum illuminance of the main illumination unit 1. For various possible light spectra and maximum illuminance levels of the main illumination unit 1, such setting values for the auxiliary illumination unit 2 are derived at which these two requirements are satisfied. The setting values are stored in conjunction with the light spectra and percentages in a table which can be evaluated by a computer. The control unit 10 has at least intermittent read access to this table.

In another embodiment, a calculation rule is stored in a data memory of the illumination device 100. The control unit applies this calculation rule to values for parameters of the illumination device 100 to derive setting values for the light sources, where the user has specified these parameter values.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1 | Main illumination unit, generated on the surface Ob the main light field $Lf_{main}$ with the maximum illuminance $Ev_{max,\ main}$, includes the main light sources 1.1, 1.2, . . . |
| 1.1, 1.2, . . . | Main light sources, belong to the main illumination unit 1, each generate a light beam $Lb_{1.1}$, $Lb_{1.2}$, . . . , 1.2, . . . , are attached to the carrier 3 |
| 1.c | Main light source emitting cool white light |
| 1.w | Main light source emitting warm white light |
| 2 | Auxiliary illumination unit, generates the auxiliary light field $Lf_{add}$ with the maximum illuminance $EV_{max,\ add}$, includes the auxiliary light sources 2.1, 2.2 |
| 2.1, 2.2 | Auxiliary light sources, belong to the auxiliary illumination unit 2, each generate a light beam $Lb_{2.1}$, $Lb_{2.2}$, are attached to the carrier 3 |

| | -continued |
|---|---|
| 2.c | Auxiliary light source emitting cool white light |
| 2.w | Auxiliary light source that emits warm white light |
| 3 | Support of the illumination device 100, carries the light sources 1.1, 1.2, 1.c, 1.w, . . . , 2.1, 2.2, 2.c, 2.w, . . . as well as the handle 5, the capturing device 6 and the distance sensor 8, is rotationally symmetrical to the central axis MA |
| 5 | central handle on the carrier 3 |
| 6 | Capturing device on the carrier 3, enables the entry of user specifications |
| 8 | optional distance sensor on carrier 3, measures distance Ent between itself and surface Ob |
| 10 | signal processing control unit, controls the light sources 1.1, 1.2, 1.c, 1.w, . . . , 2.1, 2.2, 2.c, 2.w, . . . |
| Bg | Assembly with four main light sources |
| dist | Distance from the intersection point S on the illuminated surface Ob |
| $d_x$ | Diameter of a circle on the illuminated surface Ob, in which the illuminance is still x % percent of the maximum illuminance. |
| Ent | Distance between the illumination device 100 and the illuminated surface Ob, measured by the distance sensor 8. |
| Ev | Illuminance |
| $EV_{max}$ | Maximum illuminance of the illumination device 100 on the surface Ob |
| $EV_{max, main}$ | Maximum illuminance of the main illumination unit 1 on the surface Ob |
| $EV_{max, add}$ | Maximum illuminance of the auxiliary illumination unit 2 on the surface Ob |
| K.1 | Circle around the optical center axis MA, on which some main light source 1.w, 1.c are arranged |
| K.2 | Circle around the optical center axis MA, on which the auxiliary light source 2.w, 2.c are arranged |
| $Lf_{add}$ | Auxiliary light field, generated by the auxiliary illumination unit 2 |
| $Lf_{main}$ | Main light field, generated by the main illumination unit 1 |
| $Lb_{1.1}$, $Lb_{1.2}$, . . . | Light beams of the main light sources 1.1, 1.2, . . . |
| $Lb_{2.1}$, $Lb_{2.2}$ | Light beam of the auxiliary light sources 2.1, 2.2, . . . |
| MA | Optical center axis of the illumination device 100, at the same time optical center axis of the main illumination unit 1 and the auxiliary illumination unit 2 |
| $MA_{2.1}$ | Center axis of the light beam generated by the light source 2.1, at the same time optical center axis of the light source 2.1 |
| $MA_{2.2}$ | Center axis of the light beam generated by the light source 2.2, at the same time optical center axis of the light source 2.2 |
| Ob | Illuminated surface of the object Obj, 1.2, . . . , here: surface of the patient facing the illumination device 100 on the operating table Obj |
| Obj | Object with the illuminated surface Ob, here: Operating table on which a patient is lying |
| S | Intersection of the optical center axis MA with the illuminated surface Ob |
| $S_1$ | Intersection of the optical center axis $MA_{2.1}$ of the auxiliary light source 2.1 and the illuminated surface Ob |
| $S_2$ | Intersection of the optical center axis $MA_{2.2}$ of the auxiliary light source 2.2 and the illuminated surface Ob |

What is claimed is:

1. An illumination device for illuminating a surface, the illumination device comprising:
   a main illumination unit comprising at least two light source groups; and
   an auxiliary illumination unit comprising at least one light source group,
   wherein each light source group comprises at least one light source and can be controlled independently of any other light source group,
   wherein each illumination unit is configured to achieve a respective light field on the surface with an illuminance varying over the surface,
   wherein the illumination device has a maximum achievable illuminance,
   wherein the illumination device is configured to capture an illuminance specification that determines a maximum illuminance that the illumination device is to achieve, and
   wherein the illumination device is configured such that at least, if a distance between the illumination device and the illuminated surface is within a predetermined distance range and if the maximum illuminance of the illumination device to be achieved according to the illuminance specification is at least 20% of the maximum achievable illuminance,
   then the maximum illuminance that the auxiliary illumination unit achieves on the illuminated surface is between 1% and 15% of the maximum illuminance that the main illumination unit achieves on the illuminated surface and a $d_x$ light field of the main illumination unit on the illuminated surface has an area which is at least 50% smaller than a $d_x$ light field of the auxiliary illumination unit,
   wherein the $d_x$ light field (light field diameter) of an illumination unit is that area on the illuminated surface in which the illuminance is at least x % of the maximum illuminance.

2. An illumination device according to claim 1, wherein:
   each illumination unit has a maximum achievable illuminance;
   the maximum illuminance which each illumination unit achieves is less than or equal to the respective maximum achievable illuminance of each illumination unit, and
   the maximum achievable illuminance of the auxiliary illumination unit is between 1% and 15% of the main illumination unit maximum achievable illuminance.

3. An illumination device according to claim 1, wherein the $d_x$ light field achieved on the illuminated surface by the main illumination unit is completely contained in the $d_x$ light field achieved by the auxiliary illumination unit.

4. An illumination device according to claim 1, wherein:
   the auxiliary illumination unit is configured to be switched on and switched off independently of the main illumination unit; and
   the illumination device is configured to capture a user specification for switching the auxiliary illumination unit on or off, and to switch the auxiliary illumination unit on or off depending on the user specification.

5. An illumination device according to claim 1, further comprising a signal processing control unit, wherein:
   the control unit is configured to automatically determine the maximum illuminance that the main illumination unit generates on the illuminated surface and the maximum illuminance that the auxiliary illumination unit generates on the illuminated surface; and
   the control unit is further configured to control—after capturing an illuminance specification—the main illumination unit and/or the control the auxiliary illumination unit with an objective of controlling the main illumination unit and/or the auxiliary illumination unit such that an illuminance ratio remains unchanged compared to the state before the illuminance specification was captured;
   wherein the illuminance ratio is the ratio between the maximum illuminance that the auxiliary illumination unit achieves on the illuminated surface, and the maximum illuminance that the main illumination unit achieves on the illuminated surface; and wherein the illuminance ratio is between 1% and 15%.

6. An illumination device according to claim 5, further comprising a distance sensor configured to measure an indicator for the distance between the illumination device and the illuminated surface, wherein
the control unit is configured to control the maximum illuminance that the main illumination unit generates on the illuminated surface depending on the measured distance, and
the control unit is configured to control the maximum illuminance that the auxiliary illumination unit generates on the illuminated surface depending on the measured distance.

7. An illumination device according to claim 1, further comprising a signal processing control unit wherein:
the auxiliary illumination unit is selectively operable in a first state or in a second state;
at least at a distance in the predetermined distance range the maximum illuminance achieved by the auxiliary illumination unit in the first state on the illuminated surface differs from the maximum illuminance achieved in the second state; and
the control unit is configured to determine the maximum illuminance which the illumination device with the auxiliary illumination unit in the first state achieves on the illuminated surface, to capture a specification that the auxiliary illumination unit is to be switched from the first state to the second state, to cause the auxiliary illumination unit to be switched from the first state to the second state, and to control the main illumination unit;
wherein a control objective is to control the main illumination unit such that the maximum illuminance which the illumination device with the auxiliary illumination unit in the second state achieves on the illuminated surface is equal to the determined maximum illuminance achieved with the auxiliary illumination unit in the first state.

8. An illumination device according to claim 7, wherein:
the auxiliary illumination unit is configured to be switched on and off; and
the switched-off auxiliary illumination unit is in one state and the switched-on auxiliary illumination unit is in the other state.

9. An illumination device according to claim 1, further comprising a signal processing control unit wherein:
the auxiliary illumination unit is selectively operable in a first state or in a second state;
at least at a distance in the predetermined distance range the light field diameter achieved by the auxiliary illumination unit in the first state on the illuminated surface differs from the light field diameter achieved by the auxiliary illumination unit in the second state; and
the control unit is configured to determine the light field diameter which the illumination device with the auxiliary illumination unit in the first state achieves on the illuminated surface, to capture a specification that the auxiliary illumination unit is to be switched from the first to the second state, to cause the auxiliary illumination unit to be switched from the first to the second state, and to control the main illumination unit;
wherein a control objective is to control the main illumination unit such that the light field diameter which the illumination device with the auxiliary illumination unit in the second state achieves on the illuminated surface is equal to the determined light field diameter achieved with the auxiliary illumination unit in the first state.

10. An illumination device according to claim 9, wherein:
the auxiliary illumination unit is configured to be switched on and off;
the switched-off auxiliary illumination unit is in one state and the switched-on auxiliary illumination unit is in the other state.

11. An illumination device according to claim 1, further comprising a signal processing control unit, wherein:
the illumination device is configured to provide contrast on the illuminated surface;
the provided contrast is a ratio of the maximum illuminance that the illumination device achieves on the illuminated surface and the average illuminance achieved by the illumination device on the illuminated surface in a circle around a point of maximum illuminance,
a diameter of the circle is greater than the light field diameter of the illumination device by a factor which is at least 1.5; and
the control unit is configured to capture a contrast setting concerning a contrast that the illumination device is to achieve on the illuminated surface, and to control the auxiliary illumination unit with a control objective that an actual contrast achieved by the illumination device is equal to the captured contrast setting.

12. An illumination device according to claim 11, wherein the control unit is configured to, after capturing of the specification concerning the contrast, control the auxiliary illumination unit with an additional control objective that the light field diameter achieved by the illumination device on the illuminated surface and/or the maximum illuminance achieved by the illumination device on the illuminated surface remain unchanged.

13. An illumination device according to claim 1, further comprising a signal processing control unit, wherein:
the main illumination unit and the auxiliary illumination unit are adapted to emit light each having a light spectrum and a color temperature correlated with the light spectrum, and
the control unit is configured to capture a specification for the light spectrum of the main illumination unit and/or of the illumination device, to change the light spectrum of the main illumination unit according to the captured specification, and to change the light spectrum of the auxiliary illumination unit such that, after the change, the correlated color temperatures of the two illumination units differ from each other by at most 500 Kelvin.

14. An illumination device according to claim 1, wherein:
each light source of the auxiliary illumination unit has a respective central optical axis which intersects the illuminated surface at an additional intersection point, and
each light source of the auxiliary illumination unit is configured to illuminate the illuminated surface such that the illuminance which the light source achieves on the illuminated surface assumes a maximum value at the additional intersection point and is of a lower value outside the additional intersection point; and
the additional intersection points or at least two additional intersection points are spaced apart from each other.

15. An illumination device according to claim 14, wherein:
the main illumination unit has a central optical axis which intersects the illuminated surface at a main intersection point and the additional intersection points delimit an area on the illuminated surface; and the main intersection point is spaced from each auxiliary intersection point and lies within the interior of the delimited area, and the illuminance generated by the main illumination unit on the illuminated surface is at least 10% of the maximum illuminance of the main illumination unit at any point in the delimited area.

16. An illumination device according to claim 15, wherein the illumination device is configured such that the main illumination unit generates the maximum illuminance on the illuminated surface at the main intersection point, and the respective maximum illuminance which the auxiliary illumination unit generates on the illuminated surface at an additional intersection point, is between 1% and 15% of the maximum illuminance of the main illumination unit.

17. An illumination process for illuminating a surface, the illumination process comprising the steps of:

providing an illumination device for illuminating a surface, the illumination device comprising: a main illumination unit comprising at least two light source groups; and an auxiliary illumination unit comprising at least one light source group, wherein each light source group comprises at least one light source and can be controlled independently of any other light source group, wherein each illumination unit is configured to achieve a respective light field on the surface with an illuminance varying over the surface, wherein the illumination device has a maximum achievable illuminance, and wherein the illumination device is configured such that at least if a distance between the illumination device and the illuminated surface is within a predetermined distance range, and if the maximum illuminance of the illumination device to be achieved according to the illuminance specification is at least 20% of the maximum achievable illuminance, then the maximum illuminance that the auxiliary illumination unit achieves on the illuminated surface is between 1% and 15% of the maximum illuminance that the main illumination unit achieves on the illuminated surface and a $d_x$ light field of the main illumination unit on the illuminated surface has an area which is at least 50% smaller than a $d_x$ light field of the auxiliary illumination unit wherein the $d_x$ light field (light field diameter) of an illumination unit is that area on the illuminated surface in which the illuminance is at least x % of the maximum illuminance;

capturing an illuminance specification that determines a maximum illuminance that the illumination device is to achieve, determining the maximum illuminance generated by the main illumination unit on the illuminated surface;

determining the maximum illuminance generated by the auxiliary illumination unit on the illuminated surface;

depending on the captured illuminance specification, changing a maximum achieved illuminance of the main illumination unit, changing a maximum achieved illuminance of the auxiliary illumination unit and/or changing a maximum achieved illuminance of the illumination device; and controlling the main illumination unit and/or controlling the auxiliary illumination unit such that an illuminance ratio remains unchanged, where the illuminance ratio is the ratio between the maximum illuminance that the auxiliary illumination unit achieves on the illuminated surface, and the maximum illuminance the main illumination unit achieves on the illuminated surface.

18. An illumination process for illuminating a surface the illumination process comprising the steps of:

providing an illumination device for illuminating a surface, the illumination device comprising: a main illumination unit comprising at least two light source groups; and an auxiliary illumination unit comprising at least one light source group, wherein each light source group comprises at least one light source and can be controlled independently of any other light source group, wherein each illumination unit is configured to achieve a respective light field on the surface with an illuminance varying over the surface, wherein the illumination device has a maximum achievable illuminance, wherein the illumination device is configured to capture an illuminance specification that determines a maximum illuminance that the illumination device is to achieve, and wherein the illumination device is configured such that at least, if a distance between the illumination device and the illuminated surface is within a predetermined distance range, and if the maximum illuminance of the illumination device to be achieved according to the illuminance specification is at least 20% of the maximum achievable illuminance, then the maximum illuminance that the auxiliary illumination unit achieves on the illuminated surface is between 1% and 15% of the maximum illuminance that the main illumination unit achieves on the illuminated surface and a $d_x$ light field of the main illumination unit on the illuminated surface has an area which is at least 50% smaller than a $d_x$ light field of the auxiliary illumination unit wherein the $d_x$ light field (light field diameter) of an illumination unit is that area on the illuminated surface in which the illuminance is at least x % of the maximum illuminance;

operating the auxiliary illumination unit in a first state in which the auxiliary illumination unit achieves a first maximum illuminance on the illuminated surface and/or the auxiliary illumination unit achieves a first light field diameter on the illuminated surface, determining the maximum illuminance which the illumination device with the auxiliary illumination unit in the first state achieves on the illuminated surface and/or the first light field diameter which the illumination device with the auxiliary illumination unit in the first state achieves on the illuminated surface, switching the auxiliary illumination unit from the first state to a second state, wherein the auxiliary illumination unit in the second state achieves a second maximum illuminance on the illuminated surface and/or the auxiliary illumination unit achieves a second light field diameter, which second maximum illuminance and/or second light field diameter are different from the first maximum illuminance and/or the first light field diameter, and controlling the main illumination unit whereby the control objective is that the maximum illuminance which the illumination device with the auxiliary illumination unit in the second state achieves on the illuminated surface is equal to the previously determined maximum illuminance, and/or the light field diameter which the illumination device with the auxiliary illumination unit in the second state achieves on the illuminated surface is equal to the previously determined light field diameter.

19. An illumination process for illuminating a surface, the illumination process comprising the steps of:

providing an illumination device for illuminating a surface, the illumination device comprising: a main illumination unit comprising at least two light source groups; and an auxiliary illumination unit comprising at least one light source group, wherein each light source group comprises at least one light source and can be controlled independently of any other light source group, wherein each illumination unit is configured to achieve a respective light field on the surface with an illuminance varying over the surface, wherein the illumination device has a maximum achievable illuminance, wherein the illumination device is configured to capture an illuminance specification that determines a maximum illuminance that the illumination device is to achieve, and wherein the illumination device is configured such that at least, if a distance between the illumination device and the illuminated surface is within a predetermined distance range, and if the maximum illuminance of the illumination device to be achieved according to the illuminance specification is at least 20% of the maximum achievable illuminance, then the maximum illuminance that the auxiliary illumination unit achieves on the illuminated surface is between 1% and 15% of the maximum illuminance that the main illumination unit achieves on the illuminated surface and a $d_x$ light field of the main illumination unit on the illuminated surface has an area which is at least 50% smaller than a $d_x$ light field of the auxiliary illumination unit wherein the $d_x$ light field (light field diameter) of an illumination unit is that area on the illuminated surface in which the illuminance is at least x % of the maximum illuminance;

generating a contrast on the illuminated surface with the illumination device, where the generated contrast is a ratio of the maximum illuminance that the illumination device achieves on the illuminated surface and an average illuminance achieved by the illumination device on the illuminated surface in a circle around a point of maximum illuminance, where the diameter of the circle is larger than a light field diameter of the illumination device, by a factor being at least 1.5;

capturing a contrast specification concerning a contrast which the illumination device is to achieve on the illuminated surface; and controlling the auxiliary illumination unit with a control objective that the actual contrast achieved by the illumination device is equal to the captured contrast specification, and with the additional objective that the light field diameter achieved by the illumination device on the illuminated surface and/or the maximum illuminance achieved by the illumination device on the illuminated surface remain unchanged.

* * * * *